AUTOMATIC TELEPHONE DIALING AND MESSAGE DELIVERY SYSTEM

Filed March 2, 1965

Richard L. Whitely
Lawrence A. Yaggi
Kenneth P. Shivers
Stewart Tongret
INVENTORS BY Jacobi & Davidson
ATTORNEYS May 20, 1969 R. L. WHITELY ET AL 3,445,601

AUTOMATIC TELEPHONE DIALING AND MESSAGE DELIVERY SYSTEM

Filed March 2, 1965 Sheet 2 of 4

Richard L. Whitely
Lawrence A. Yaggi
Kenneth P. Shivers
Stewart Tongret
INVENTORS BY Jacobi & Davidson
ATTORNEYS Richard L. Whitely
Lawrence A. Yaggi
Kenneth P. Shivers
Stewart Tongret
INVENTORS
BY Jacobi & Davidson
ATTORNEYS Richard L. Whitely
Lawrence A. Yaggi
Kenneth P. Shivers
Stewart Tongret
INVENTORS BY Jacobi & Davidson
ATTORNEYS United States Patent Office 3,445,601
Patented May 20, 1969

3,445,601

AUTOMATIC TELEPHONE DIALING AND MESSAGE DELIVERY SYSTEM

Richard L. Whitely, Richardson, Lawrence A. Yaggi, Dallas, and Kenneth P. Shivers, Garland, Tex., and Stewart Tongret, Santa Monica, Calif., assignors to U.S. Telephonics, Inc., Abilene, Tex., a corporation of Texas Filed Mar. 2, 1965, Ser. No. 449,909
Int. Cl. H04m *11/00, 1/26, 1/64*
U.S. Cl. 179—6 40 Claims

ABSTRACT OF THE DISCLOSURE

A novel and versatile telephone dialing and message delivery system is disclosed. The system comprises a first magnetic storage means carrying successive dial signal sequences thereon and a second magnetic storage means carrying recorded message signals thereon, at least one of the magnetic storage means also having control signals thereon. A control circuit is provided for both magnetic storage means and is responsive to both the control signals thereon as well as to return signals received from a telephone line. The control circuit operates to cause a dial signal sequence to be delivered to the telephone line, and to detect the operating condition at a station linked in the line in accordance with a given dial sequence. In response to the operating condition detected, the control circuit will alternatively cause message signals to be delivered to the line assuming the called station answered, or will cause the delivery of the next succeeding dial signal sequence to the line assuming that the previously called station either did not answer or was busy. If the called station answered, then subsequent to the delivery of message signals to the line, the control circuit likewise initiates the delivery of the next succeeding dial signal sequence to the line in a cyclic action. The inventive system further comprises switching means responsive to the control circuit for delivering the dial signal sequences to the line, conditioning the control circuit means to detect the operating condition of the called station, and for delivering the message signals to the line. The novel system operates in a manner such that in succeeding cycles thereof, the dial signal sequences corresponding to stations that either did not answer or were busy are dialed again, the dial signal sequences corresponding to stations that did answer being erased from the first magnetic storage means.

This invention relates to telephone systems, and is particularly concerned with the provision of an automatic telephone dialing and message delivery system which is capable of automatically delivering a prerecorded message to a substantial number of different individuals and/or homes.

For many purposes, it is extremely desirable to be able to deliver a given message to a selected portion of the public. It is further highly desirable to be able to deliver such message merely by storing selected telephone numbers and thereafter delivering the message automatically. For example, for advertising purposes, one may wish to indicate to some segment of the public the advantages of a particular product, the existence of a sale at a particular store or location, or other similar information.

Alternatively, there are certain situations and businesses which require an individual to call a selected number of people to deliver a particular message and/or supply certain reminder information. In this regard, and again by way of example, it is common practice for a nurse in a dentist's office to periodically call a selected group of patients to remind them of the periodic checkup which is then due. Conventionally, the nurse would dial the patient, using the conventional telephone set, and if the patient answered, the reminder would be given. However, if the patient did not answer, then the nurse would be required to recall the number until such time as she was able to reach the patient. It would be desirable for this purpose to provide a system with which the patients could be called automatically and/or with which the nurse need merely dial the patient once, and thereafter if the patient did not answer, the patient could be called repeatedly automatically until the patient answered, whereupon they would receive the reminder message.

Bearing in mind the foregoing, a primary object of the present invention is to provide an automatic telephone dialing and message delivery system that will satisfy the aforesaid objectives, and further prove simple and dependable in operation. More specifically, it is a primary object of the present invention to provide an automatic telephone dialing and message delivery system which is capable of (1) automatically dialing a prerecorded series of numbers, (2) delivering a message to any answered number, and (3) repeating the call to any number which does not answer, until the message is delivered thereto, without repeating the call to any number which has answered.

Consistent with the preceding more general objects, certain more specific objects of the present invention include: (a) the provision of such a system which is electromechanical in nature and which is fabricated into a mechanical type package comprising two information storage means or devices, preferably in the form of magnetic tape decks, control and monitoring circuits, switching logic circuitry, and a power supply; (b) the provision of such a system which is easily capable of utilizing transistorized components and printed circuit boards for wiring and mounting facility; (c) the provision of such a system which does not require phone number decoding, thus minimizing the possibility of error in data processing; and (d) the provision of such a system which is capable of using commercially available standard magnetic tape cartridges for the information storage means or devices.

Even further somewhat specific but still significant objects of the invention are: (a) to provide a system within the broader objectives outlined hereinabove, which system is capable of automatically being rendered operative only during selective time periods of a day, if desired; (b) to provide such a system which permits the operator to follow the system sequence through monitoring means which audibly indicate the exact function of the system being performed at any instance; and (c) to provide such a system which does, or can easily, indicate readily the total time of its operation and the number of calls completed by the system as of a given moment and/or within a prescribed period.

Again turning to the relatively broader aspects of the invention, important objects hereof include: (1) the provision of a system which alternatively is capable of being linked directly with a telephone line, or capable of being used to directly actuate and control a standard telephone hand set unit to effect the ultimate results desired; and (2) the provision of such a system which can operate with a plurality of magnetic tape information storage cartridges, a single magnetic tape storage cartridge having a tape therein with a plurality of channels thereon, or alternatively, tape information storage means in the form of tape cartridges, wherein the tape has a multiplicity of channels thereon so as to permit the simultaneous dialing of a multiplicity of telephone numbers and/or so as to permit the selective dialing of only certain groups or members of the public who meet certain standards such as age, salary, or the like.

Again referring to the adaptability and various capabilities of the invention, it is a significant object of the present invention to provide a system operating as aforesaid and yet capable of easily being utilized to effect dialing with the now conventional "make and break" type arrangement, and/or to effect dialing with the proposed new "tone-type" dialing system.

Consistent with the preferred embodiment of the invention, the system operates to sense the time of day and start automatic operation during a selected time interval. With operation, the system detects the presence of a dial tone and in response thereto, starts a dial information storage means. After a selected number has been dialed, the system automatically waits for an answering response, and if no response is received within a predetermined time, the system proceeds to dial another number. If a response is received, the system detects the presence of a human voice, such as, for example, a "hello" sound, and in turn, actuates a message information storage means to deliver the message over the telephone line. The system eliminates the effectiveness of the dial signals for any number where a call has been completed, preferably by "writing over" the called number thus essentially "erasing" the same, whereby the system prevents dialing of completed numbers on subsequent operations. Even further, the system can sense power failures, and stop equipment operation in the event of a power failure, and the system automatically provides for certain "wait" times to be certain that a "hang-up" type operation is completed.

Although detecting the presence of a human voice to effect consequent activation of the message information storage means is used in one embodiment of the invention, another embodiment hereof utilizes the polarity reversal on the line resulting from "pick-up" of the hand set at the remote location to effect actuation of the message information storage means. Similarly, while with one embodiment the system can operate directly in a telephone line, it can be used alternatively to operate the standard telephone unit such as normally used in an office or home so that the system is not directly connected in the telephone line.

The aspect of sensing of power failures and stopping equipment operation, as discussed above refers to an opeartion whereby upon a power failure, the equipment is effectively removed from the telephone line so as to not "tie-up" a circuit over an extended period of time.

The invention will be better understood, and objects other than those specifically set forth above will become apparent when consideration is given to the following detailed description. Such description refers to a preferred and illustrative embodiment of the invention as shown and explained in connection with the annexed drawings, wherein.

Figures 5, 6:
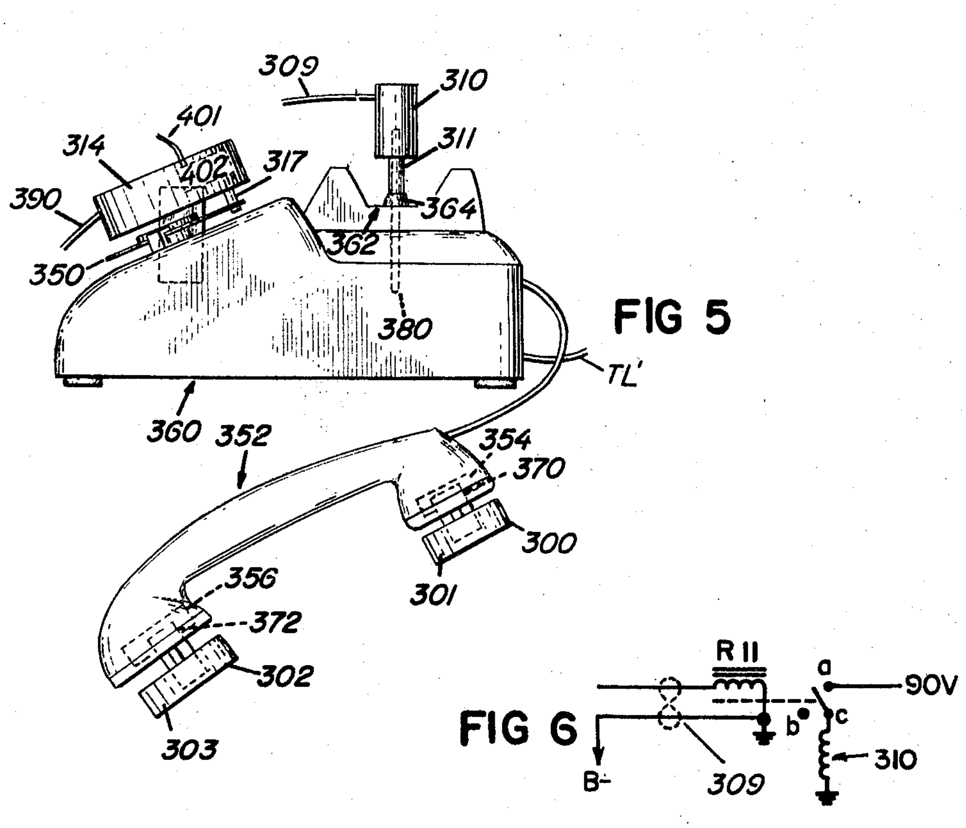
Figures 1, 4:
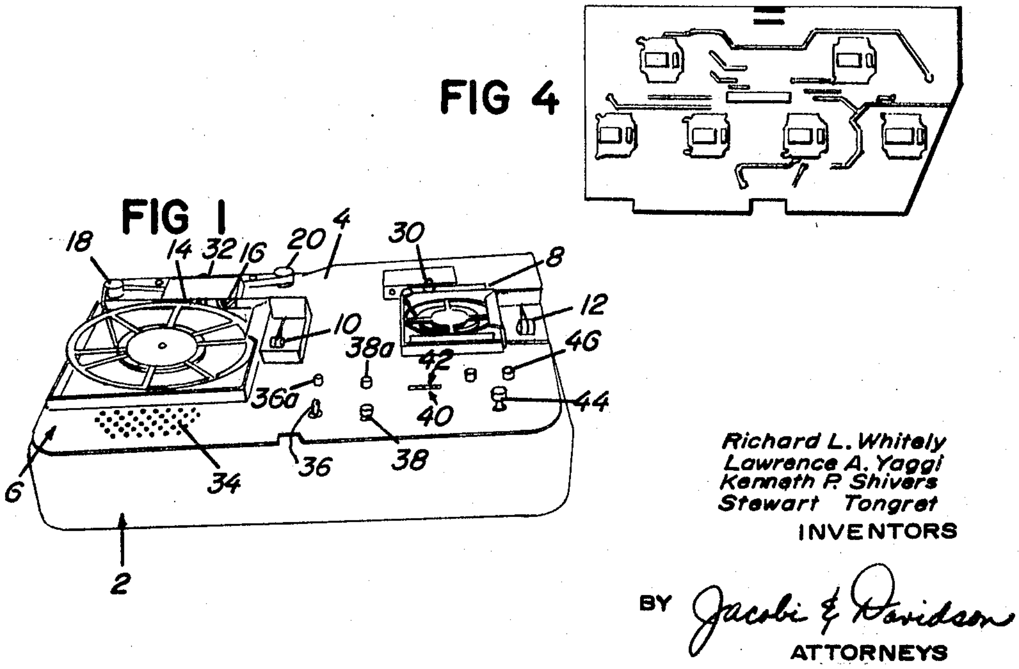
FIGURE 1 is a perspective view of an automatic telephone dialing and message delivery device constructed in accordance with the present invention.
Figure 2:
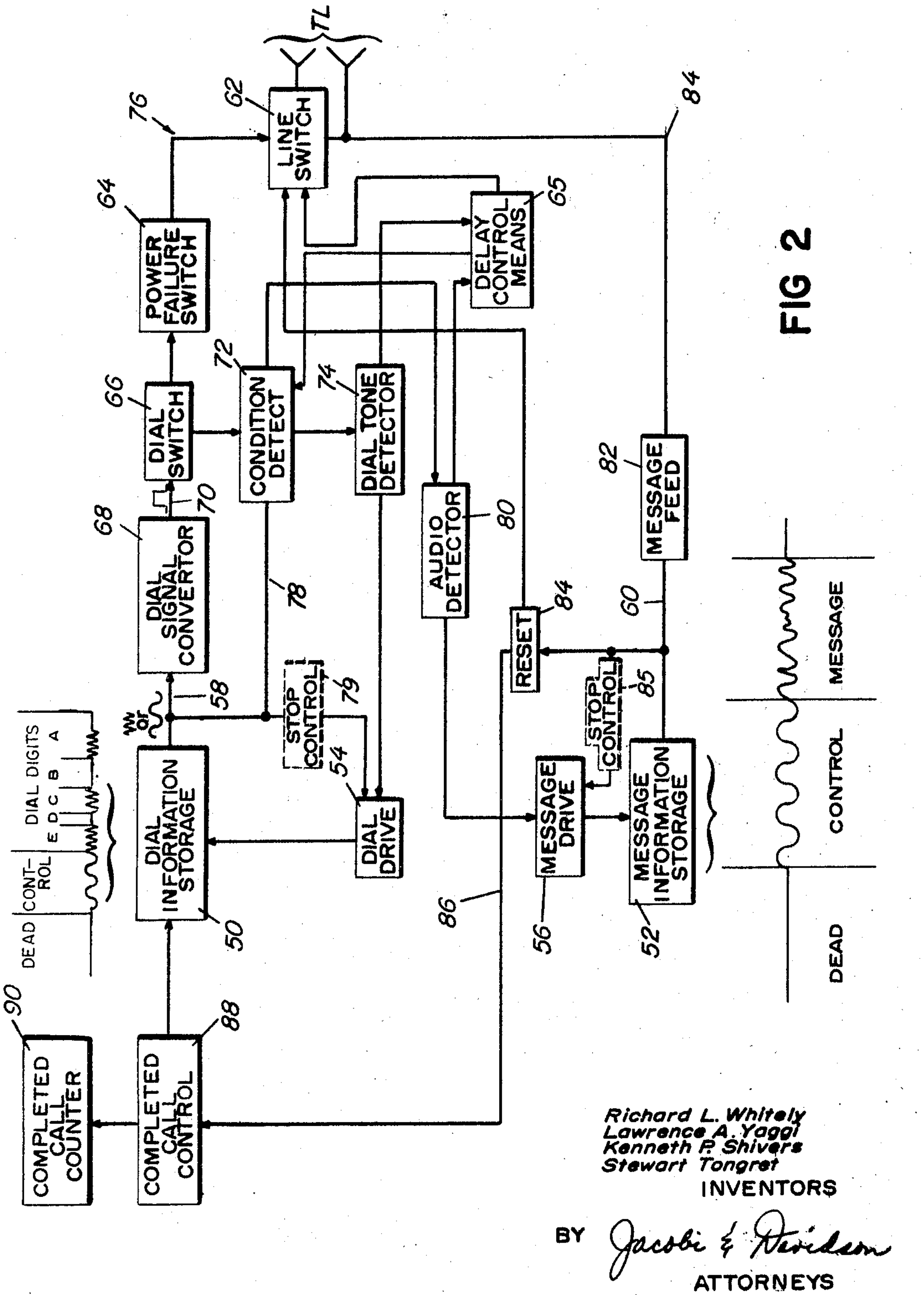
FIGURE 2 is a schematic block diagram of the preferred system used in the device of FIGURE 1.
Figure 3A:
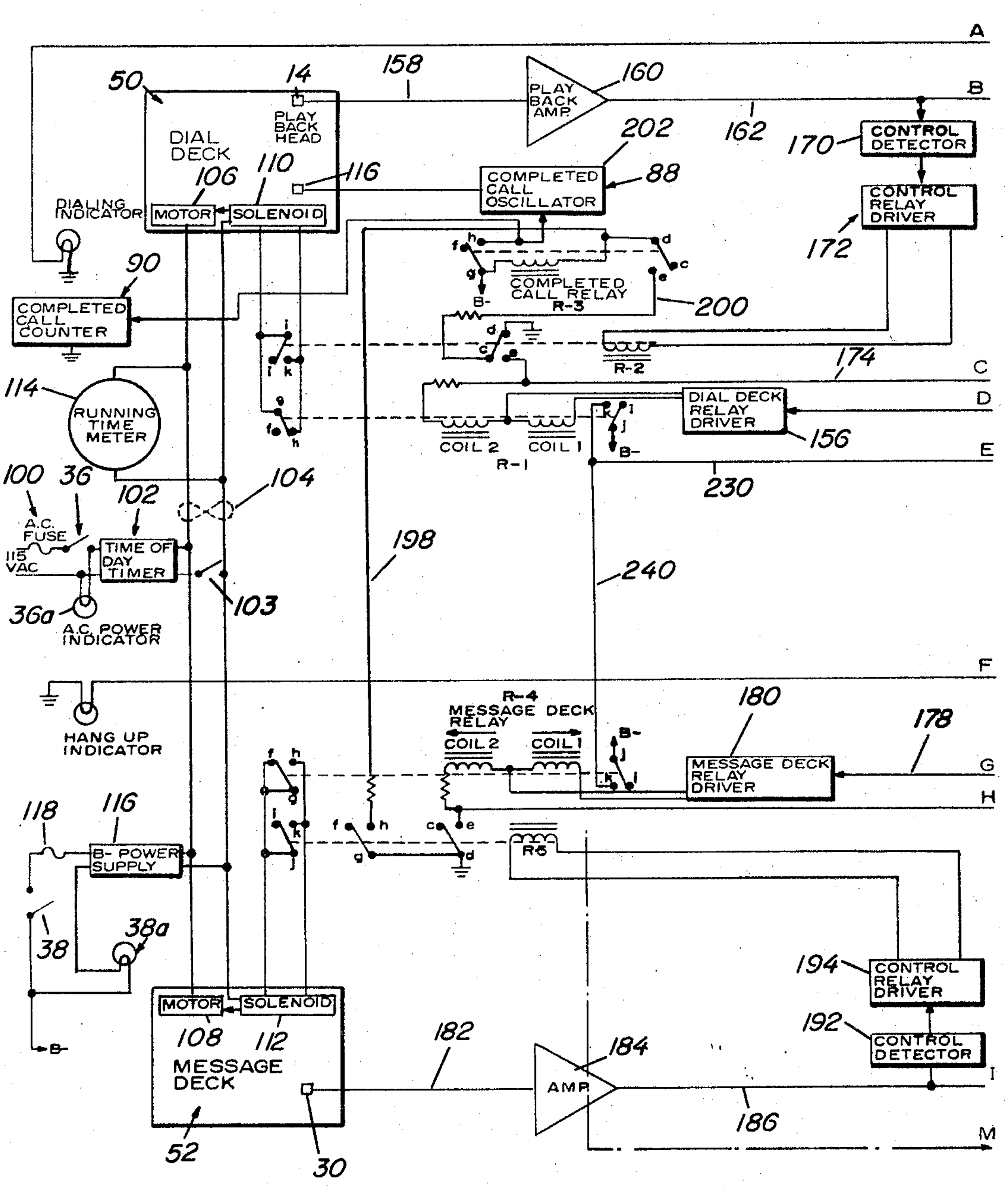
Figure 3B:
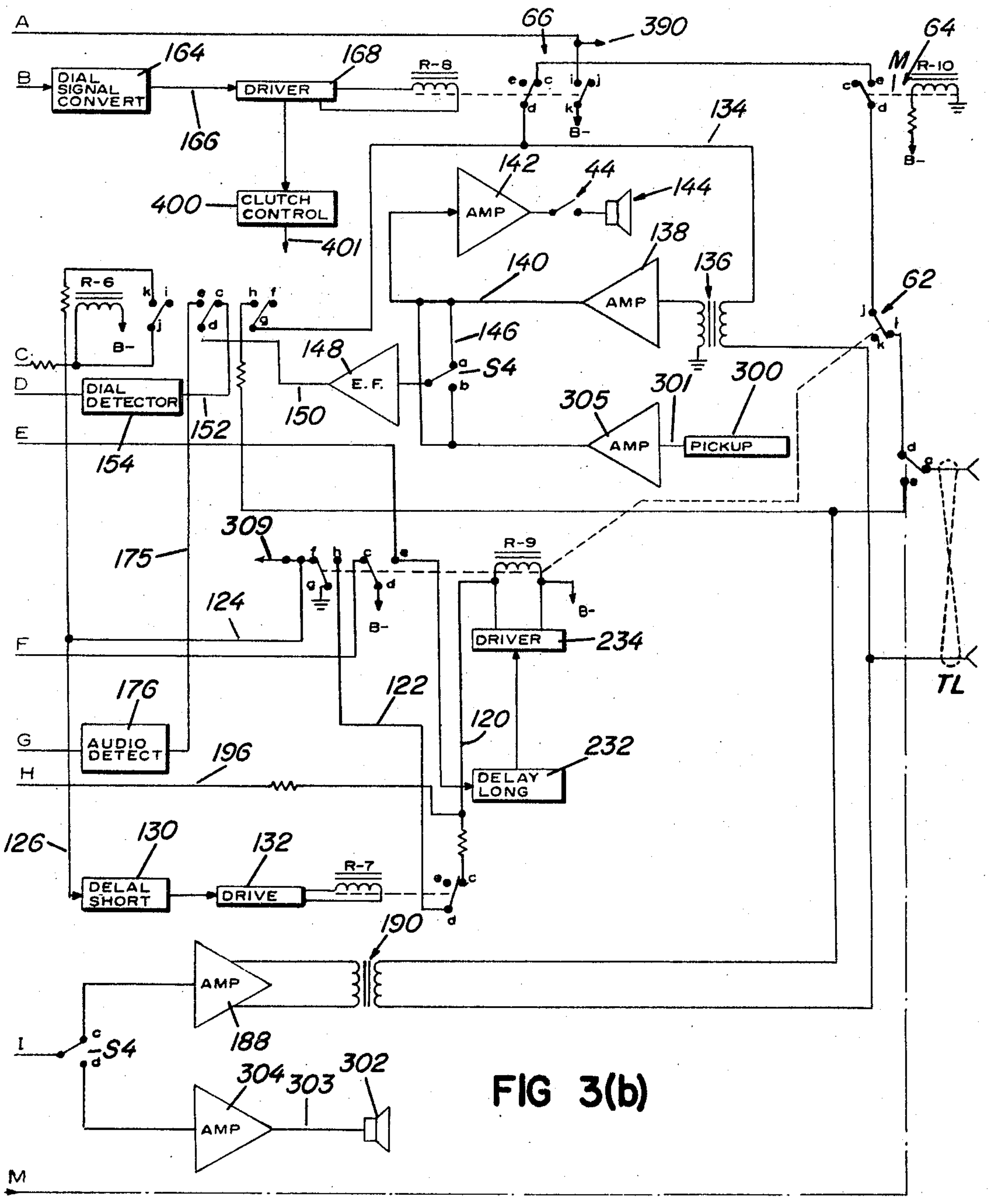

FIGURES 3A and 3B together present a complete schematic diagram of the system otherwise shown in the block diagram of FIGURE 2;

FIGURE 4 is a perspective view of a printed circuit board and associated components such as can be used with the invention;

FIGURE 5 is a partially schematic side view of a standard telephone unit modified in accordance herewith to provide part of an overall system operating indirectly to a telephone line; and FIGURE 6 is a fragmental schematic diagram of the "hang-up" operating network preferably used with the ararngement of FIGURE 5.

To understand the manifest simplicity of the unit and the convenience with which the same can be selectively moved from location to location, attention is initially directed to FIGURE 1. In this figure, an entire system constructed in accordance herewith is shown as assembled into an ultimate device adapted to be immediately connected with a telephone line through a suitable means such as, for example, a standard phone jack.

The unit of FIGURE 1 includes a casing 2, such as the bottom of a suitcase, having a top panel 4 extending thereacross. Mounted on the top panel 4 are a pair of tape decks 6 and 8, the tape deck 6 serving as a dial information storage means, and the tape deck 8 serving as an information storage means. These tape decks are standard continuous loop tape cartridges of the type available on the commercial market today. The tape decks are removably secured in operative relation on the top panel 4 by means of the deck lock and release levers 10 and 12.

Associated with the tape deck 6 are a pair of heads 14 and 16 respectively serving as pickup and recording heads in the preferred embodiment of the invention. The heads 14 and 16 face that side of the tape carrying the signals magnetically stored on the tape, with the heads 14 and 16 being spaced apart (i.e., disposed at first and second locations). The tape travels initially past the head 14 and then about a series of rollers 18 and 20 so that a predetermined length of the tape extends between the head 14 and the head 16. This predetermined length of tape is so arranged, as explained more fully below, that the recording head 16 is in proper position to "write over" a previously called number at the proper time. The message deck 8 cooperates with a pickup head 30 also facing the signal side of the tape. Actually, the message tape deck and pickup head associated therewith, as well as the drive therefor, are conventional, and can be purchased on the open commercial market at the present time. The information storage deck 6, on the other hand, while conventional in basic nature, has been modified in accordance with the invention so as to include the extended loop portion 32 between the pickup head 14 and recording head 16. Other than in this regard and the difference in size, however, the tape deck 6 is the same as the tape deck 8, and since the locking and release mechanisms therefor, the tape decks or cartridges themselves, and the pickup and recording heads are all conventional, additional discussion thereof is unnecessary.

Also included on the top panel 4 of the unit 2 is a grill or perforated section 34. A monitor speaker (not shown) is mounted directly under the section 34 so that the speaker output can pass through the section 34 and readily permit an operator to audibly follow the system functions.

AC and DC power switches 36 and 38 are mounted on the top panel, and adjacent each of these switches is a lamp, **36*a* and 38*a* respectively, connected in circuit with the AC power and DC power so as to indicate that such power supplies are functioning in the desired manner. A counter 40 is directly under the top panel 4 with the numerical dials of the counter appearing through the opening 42** in the top panel. This counter serves to indicate the number of calls which have been completed.

A monitor switch 44 and a monitor light 46 are further mounted on the top panel 4. The monitor switch permits the operator to selectively connect the monitoring arrangement in operative condition, and the monitoring light 46, when the monitoring system is operating, flashes to indicate the dialing operation being performed.

In use of the system, the operator initially turns on the AC power switch 36 and the DC power switch 38, and if desired, the operator further turns the monitoring switch 44 to its "on" condition. As soon as the AC and DC power switches are placed in operation, and assuming that it is desired that the system operate at that time of day, then the system begins its automatic operation to selectively call a number, wait for an answer, give a message if there is an answer, or proceed to the next number if there is no answer. These operations, and the basic system arrangement for accomplishing the same will be better understood by reference to FIGURE 2.

Referring to FIGURE 2, the system includes a dial information storage means 50 and a message information storage means 52. The dial information storage means 50 preferably comprises a tape cartridge such as the tape cartridge 6 of FIGURE 1, and similarly, the message information storage means 52 preferably comprises a tape cartridge such as the tape cartridge 8 shown in FIGURE 1. Recorded on the dial information storage means are a plurality of dial signals and control signals. Specifically, as shown in the bracketed portion of FIGURE 2 immediately above the dial information storage means, the dial information tape has recorded thereon in successive order, and essentially for any given call, a set of dial signals and a control signal, followed by a dead space.

The dial signals are representative of the digits, and for convenience of understanding in this regard, it will be noted that on FIGURE 2, the dial signal section has been subdivided into spaces A, B, C, D, and E. In the spaces A, C, and E, there is recorded a 1 kc. signal having a 60 msec. duration. The space D is essentially a dead space preferably having a 40 msec. duration. On the contrary, the space B is a dead space preferably having a 400 msec. duration. In the space A, only one 1 kc. signal burst has been recorded, and thus, the space A represents the digit 1. The space B represents the pause between digits, or specifically, what is known in the industry as the "interdigit" pause. The spaces C, D, and E represent the digit 2. Here, it is to be noted that there are two 1 kc. bursts, namely, in spaces C and E, separated only by the comparatively short dead space D commonly known in the trade as the "make time," with the spaces C and E being known in the trade as the "break time."

In the immediately preceding explanation, it will be readily understood that just as in the usual telephone dial, the dialing information can easily consist of any number from 1 to 10. The number of 1 kc. bursts or signal bits appearing between each inter-digit pause or long dead space represents the actual digit to be dialed. If, as conventional at the present time, the numbers are to be dialed are seven digits, then there would be seven sequences of 1 kc. signals in the dial space allotted on the tape for each number or dialing sequence. Within this dial space, each 1 kc. information bit would be separated at least from the next 1 kc. information bit by a "make time" space, such as the space D, and if a particular 1 kc. information bit was the last bit for that particular digit, then it would be followed by an inter-digit pause, such as the space B.

Bearing in mind the foregoing, it should be readily apparent that the 1 kc. signals can be easily placed on the tape by merely using a normal telephone dialing arrangement to control a 1 kc. oscillator which operates through a recording head to pre-record the dialing information.

Each number being dialed is followed by a control signal on the dial information storage means, or dial tape, which control signal has a substantially different frequency than the frequency used for the individual dialing digits or dialing information bits. Preferably, the control signal has a frequency of the order of 100 cycles per second. The control signal is followed by a dead space on the tape in the preferred embodiment, and the dead space is followed by the next sequence of dial information bits.

Turning from the dial information storage means 50 to the message information storage means 52, we again have a situation where different signals are recorded in sequence. On the message information storage means, a message is recorded in a message space, and this is followed by a control signal. The control signal in this instance is again preferably a 100 c.p.s. signal, and this control signal is similarly and preferably followed by a dead space.

From the immediately preceding description, it will be understood that the system includes a dial information storage means 50 having dial signals and control signals therein, and a message information storage means 52 having a message thereon and a control signal thereon.

The respective information storage means are associated with respective operating means therefor. The operating means for the dial information storage means includes a dial drive means 54 and the operating means for the message information storage means includes a message drive means 56. Each operating means further includes a pickup means or transducer for feeding the signals from the respective storage means to the desired component or components. Thus, a first operating means is incorporated for driving the dial information storage means and feeding dial signals and control signals respectively therefrom, and a second operating means is incorporated for driving the information storage means and feeding the message and control signals therefrom. Also, appearing at the output of the dial information storage means, and specifically on the line 58, is either the dial signal information or the control signal information referred to hereinabove. Similarly, appearing at the output of the message information storage means and specifically on the line 60 is either the message signal or the control signal carried on the message information storage means, or no signal at all (dead space).

Having an understanding of the type of information carried on the respective storage means and further having an understanding of the general means incorporated for operating the same, attention can now be directed to the cooperation between remaining system components. In this regard, the telephone line shown in FIGURE 2 is designated at TL. This line is connected through a line switching means 62 (hereafter line switch), a power failure switching means 64 (hereafter power failure switch), and a dial switching means 66 (hereafter dial switch), to a dial signal convertor 68. The dial signal convertor is responsive to the dial digit information (i.e., 1 kc. signals) and serves to convert such 1 kc. signals, without decoding, into a square wave such as the square wave shown immediately above the line connection 70.

Assuming initially that the system is connected with the line TL and that the line switch 62 and power failure switch 64 are closed, it will be noted that the line leads "in" through these switches which cumulatively provide an electrical feed connection 76, to the dial switch 66. The dial switch 66 is coupled through a condition detector means 72 (hereafter condition detector) with a dial tone detector means 74 (hereafter dial tone detector). In initial operation, if the line switch 62 is closed, if the power failure switch 64 is closed, and if the dial switch 66 is closed, then the dial tone appearing on the line TL would feed through the condition detector switch to the dial tone detector 74.

The condition detector comprises a normally closed switch which completes the path to the dial tone detector 74. The dial tone detector produces an output signal in response to detection of a dial tone on the telephone line, and is coupled to the first operating means, including the dial drive 54, so as to actuate the dial information storage operating means in response to detection of a dial tone. In other words, if the switches 62, 64, 66 and 72 are closed, the first operation is the detection of a dial tone and in turn, the initiation of operation of the dial information storage means. This results in initially feeding the dial information bits or signal sequences over the line 58 to the dial signal converter 68. The dial signal converter in turn converts the dial signal information bits into square waves and the square waves operate the dial switch 66 so as to break the line, thus breaking the electrical feed connection 76 to the line TL in accordance with the dial information bits.

In the normal dialing sequence with a standard telephone set such as used in the home, office or the like, operation of the dial disc results in breaking the line in a predetermined sequence with make and break times as referred to above, and with the interdigit pauses as referred to above. The operation of the dial switch 66 is identical with this type of described operation and, in fact, as explained more fully below, the dial switch 66 can include, in part, a standard telephone set.

Once the system has initially detected the dial tone and, in turn, once the dial information storage means has been set into operation, the dial information bits are used, as prescribed, to dial a particular preselected telephone number. After this number has been dialed, a control signal on the dial information storage means appears at the output, i.e., specifically on the line 58. This control signal has a different frequency than the dial information bits, and this control signal is used to operate the condition detector 72. As should readily be apparent, both the dial information storage bits and any other signals appearing on the line 58 also appear on the line 78. However, the condition detector 72 is not responsive to the dial information signal bits, but on the other hand, is responsive to the control signal which follows each sequence of dial information storage bits. As a result, the condition detector 72, upon receipt of the control signal from the dial information storage means, serves to connect the electrical feed connection 76, or incoming lines, with an audio detector 80. Phrased in other terms, the condition detector 72 is connected to the dial information storage means 50 and is operative to connect the audio detector 80 with the telephone line TL when a control signal is fed from the dial information storage means 50.

The audio detector 80 is adapted to detect a return signal, specifically a signal corresponding to a voice signal fed over the telephone line TL, and to produce an output signal in response thereto. In other words, after the telephone number has been dialed in the manner indicated, the control signal appears at the output of the dial information storage means, and this control signal serves to couple the audio detector through the condition detector 72, the dial switch 66, the power failure switch 64, and the line switch 62 with the line TL. If a person at the number being called answers the call, saying for example, "Hello," then the audio detector receives an electrical signal corresponding to this voice signal and, in turn, produces an output signal. The output signal from the audio detector initiates operation of the message drive 56 and signals are fed from the mesage information storage means 52. As a result, if a person at the number being called answers the call, then the audio detector essentially starts the message information storage means or message deck and the message is promptly delivered. This message passes via the line 60 to a message feed means 82 and then via the line 84 to the telephone line TL.

Once the message has been completed, a control signal appears on the line 60. This control signal has no effect on the message feed means 82, but a reset means 84 is included, which reset means responds to the control signal fed from the message information storage means to restore the system to its initial condition.

It has been assumed hereinabove that a particular number was dialed, that a person answered at the number being dialed, and that a message was delivered. It was further assumed that the line switch 62 was closed. However, operation of this line switch is an important factor in the system of FIGURE 2, being significant with regard to initial conditioning of the system, as well as with regard to operation of the system if there is no answer and/or if the number dialed is "busy."

The line switch 62 is operable during use of the system in a connect condition completing the electrical feed connection 76, and is also operable to a disconnect condition opening the electrical feed connection 76. To control the operation of the line switch 62, a delay control means 65 is incorporated. The delay control means serves to normally operate the line switch 62 to its disconnect position within a predetermined time after it has been in its connect condition and to return it to its connect condition within a predetermined time after it has been in its disconnect condition. Specifically, assuming the line switch has been in its connect condition for a predetermined time, then in the absence of other factors, the delay control means would operate the line switch 62 to its disconnect condition thereby effecting a "hang-up" operation of the system. The delay control 65, however, is responsive to an output from the dial tone detector 74 and also to an output from the audio detector 80.

When the system initially starts, therefore, if the line switch 62 is closed, and a dial tone appears on the line, then, and in that event, the delay control means is rendered inoperative to effectuate operation of the line switch 62 to its disconnect condition. The number is then dialed in accordance with the preceding discussion and the control signal fed from the information storage means serves to connect the audio detector in the line. If, within a predetermined time there is no answer, then, and in that event, there is not output from the audio detector. Accordingly, the delay control means is free to operate the line switch 62 to its disconnect position so that the system automatically "hangs up." Similarly, if the number is dialed and a "busy" signal appears on the line, then the audio detector, not being responsive to the frequency of the "busy' signal again does not produce an output. In turn, the delay control means is again free to operate the line switch to its disconnect condition at the end of a predetermined period.

The delay control means 65 in addition to being operative to open the line switch 62 after it has remained in a connnect position for a predetermined period of time, also operates as indicated to close the line switch 62 or move the same to its connect condition after it has been in a disconnect condition for a predetermined period of time. This latter factor is significant to the start of a new dialing sequence, as explained hereafter.

If the number being called is busy, and/or if the number being called does not answer, then and in that event, as indicated, there is no output from the audio detector 80, and the message information storage means and the message operating means are never set into operation. These components, therefore, remain in their initial condition. However, after the number was dialed, the condition detector 72 did connect the audio detector 80 with the electrical feed connection 76 and before another can be called, it is necessary that this connection be removed so that the condition detector again connects the dial tone detector 74 with the electrical feed connection 76.

To understand this operation, consider again the dial information storage means. When the control signal is fed therefrom, the condition detector 72 connected the audio detector 80 with the telephone line. At the end of the control signal, the operation of the dial information storage means is stopped. In this regard, the system can be considered as including a stop control means 79 which responds to the control signal from the dial information storage means to deactivate the dial drive means. This stop control also, however, can be considered as part of the condition detector and dial tone detector, and for this reason is shown in phantom in FIGURE 2.

After operation of the dial information storage means has stopped, the system "waits" a predetermined time for an answer. If there is no answer during such predetermined time, then the delay control means 65 serves to (1) return the condition detect means 72 to its original condition so that the electrical feed connection 76 is coupled through the dial switch means 66 and the condition detect means 72 to the dial tone detector and (2) open the line switch 62. The delay control means 65 is free to exercise these intended function since if there is no answer and/or if the number is busy, there is not output from the audio detector 80 or reset means 84 which maintains the delay control means 65 inactive.

Within a predetermined time after opening the line switch, however, the delay control means again closes the line switch 62 and at this time, a dial tone again appears on the line which dial tone is fed back through the electrical feed connection 76, dial switch 66 and condition detector 72 to the dial tone detector 72. At that time, the next number is called.

If a message was delivered, then the reset means 84 becomes important. As noted above, the reset means responds to the control signal fed from the message information storage means 52. At the end of this control signal, operation of the message information storage means is stopped. In this regard, the system can be considered as also including a stop control means 85 which responds to the control signal from the message information storage means to deactivate the message drive means 56. This stop control 85 also, however, can be considered as part of the reset means and audio detector, and for this reason is shown in phantom in FIGURE 2 like stop control means 79.

Now, turning again to the reset means 84, it will be noted that the same is linked via the connection 86 with a completed call control 88 and a completed call counter 90. The reset means is responsive to the control signal from the message information storage means and produces an output received at the completed call control. This completed call control includes a recording head such as the recording head 16 (FIGURE 1) and this recording head serves to block out the digital information bits representing the number to which the call has been completed. Simultaneously, the output from the reset means 84 passes either directly or through the completed call control 88 to the completed call control counter 90 so as to actuate this counter one digit. The reset means 84 further serves to restrain the delay control means from operating the line switch 62 to its disconnect condition until the message has been delivered and the system is ready to start another call.

Summarizing the foregoing, the system of FIGURE 2 includes a dial information storage means 50 having dial signals and control signals therein; first operating means including the dial drive means 54 for driving the dial information storage means and feeding dial signals and control signals successively therefrom; dial switching means 66 adapted to normally make an electrical feed connection 76 between the system and a telephone line, which dial switching means is operable to a disconnect condition breaking the electrical feed connection 76 between the telephone line and the system; dial signal converter means 68 adapted to receive the dial signals as fed from the dial information storage means via the line 70 and operate the dial switch 66 to the disconnect condition in accordance with the dial signals; dial tone detector means 74 adapted to be connected with the telephone line via the dial switch 66 and electrical feed connection 76, which dial tone detector means produces an output signal in response to detection of a dial tone and which dial tone detector means is connected to the first operating means for the dial information storage means to actuate the first operating means in response to detection of a dial tone; audio detector means 80 adapted to detect a voice signal fed over the telephone line TL and produce an output signal in response thereto; conditioning means 72 connected to the dial information storage means and being operative to connect the audio detector means 80 with the telephone line TL when a control signal is fed from the dial information storage means 50; message information storage means 52 having a message thereon and a control signal thereon; second operating means for driving the message information storage means 52 and feeding the message and control signals therefrom, the second operating means being responsive to the output control signal from the audio detector means 80 to start driving the message information storage means; line switching means 62 being normally operable during use of the system in a connect condition completing the electrical feed connection 76 but being also operable to a disconnect condition opening such electrical feed connection; delay control means for normally operating the line switching means to its disconnect condition within a predetermined time after it has been in its connect condition and then returning the line switching means to its connect condition after a predetermined length of time, the delay control means being responsive to the output signal of the audio detector means and the output signal of the dial tone detector means 74 for not operating the line switching means 62 to its disconnect condition; and reset means 84 for restoring the system to its initial condition in response to a control signal from the message information storage means.

Having now considered the overall operation of the preferred embodiment of the system provided hereby and having further considered the general circuit arrangement and general circuit components, attention can be directed to FIGURE 3 presenting the actual circuit of the preferred embodiment hereof in substantial detail. FIGURE 3 consists of two sections designated in the drawing as FIGURE 3A and FIGURE 3B. These resepective sections are connected together as at A, B, C, D, E, F, G, H, and I.

Initial system operation is started, as indicated previously, by closing the respective AC and DC power switches 36 and 38. The AC power switch 36 is connected in series with an AC fuse 100 and across a conventional AC power line, such as the 115-volt AC power line commonly available at a conventional wall outlet. An AC power indicator or lamp 36*a* is connected in parallel across the AC line so as to be energized when the switch 36 is closed.

Following the AC power lamp 36*a* is a timer 102 of conventional design adapted to permit the selective operation of the system only during prescribed time periods of a day. For example, if it is desired that the system only operate between 8:00 p.m. and 10:00 p.m., then the timer 102 would be so set, and even if the switch 36 was closed, AC power would not be fed to the system unless and until the prescribed time period existed. The timer 102 essentially is a time switch which prevents power from being supplied to the system input power line 104 unless the switching means of the timer (not shown) is closed. Of course, it will be understood that the timer 102 can be easily adjusted to preset any prescribed time period, and moreover, that the same can be rendered ineffective and/or bypassed if desired.

The input power line 104 leads respectively to a motor 106 for the dial deck and a motor 108 for the message deck. In each instance, however, line 104 leads through a solenoid, namely, dial deck solenoid 110 and a message deck solenoid 112. The dial deck motor and message deck motor are not activated or energized until the respective solenoids 110 and 112 associated therewith specifically cause actuation or energization.

Also coupled across the line 104 is a running time meter 114 of conventional design, which running time meter is adapted to indicate the time during which power is supplied to the line 104, and in turn, the time during which the system is in operation. If the system is used on a rental basis, and/or if the system is being operated on a charge basis for a given customer or client, then the running time meter can provide a proper indication for the charge to be made.

Also connected across the line 104 is B− power supply 116 which derives its power therefrom. The power supply 116 is again of conventional design supplying a B− output which is used throughout the system to power the various components thereof. The B− power supply 116, however, is not rendered effective unless the DC power switch 38 is closed, and if such switch is closed, then the DC power lamp or indicator 38*a* is energized to give the operator notice that the B− power supply is functioning satisfactorily. For safety purposes, a fuse 118 is connected in series with switch 38.

After the system has been connected with an AC power source, such as a conventional wall outlet, after the switch 36 has been closed, after the switch 38 has been closed, and assuming the timer 102 is so set that the system is designed to operate during the period under consideration, then the system is ready to perform its automatic functions.

At this time, the various switching means in the overall system are set in their initial positions, namely, the positions shown in solid line for the various switches and switching elements in FIGURE 3. In each instance, the switches consist of contact pairs and/or contact groups operated by and in association with the operation of a given relay. Thus, the switch contact points, for convenience, have been designated individually by particular letters *a–k* inclusive, and the relays have been designated by the letter R plus a number. By way of example, the power failure switch 64 comprises a relay R–10 having contact points *c*, *d* and *e*, with the contact point *d* being selectively connected either with the contact point *c* or the contact point *e* depending on the condition of relay R–10. The dash line M associated with the relay R–10 indicates the actuating connection between the relay R–10 and the switch blade that selectively links contact *d* with either contact *c* or contact *e*. Bearing in mind this example and this mode of explanation, the designations for other contact pairs and sets and the actuating links between the relays operating the switch elements will be readily understood in the following discussion.

When the system is initially set into operation, relay R–9 is energized, and thus in explaining the operation it is proper to assume that R–9 is energized. In this condition R–9 is connected on one side via the line 120, contacts *c* and *d* of R–7, line 122 and contacts *h–g* of R–9 to electrical ground, and on the other side to B–, as shown. Relay R–9, being energized, opening line switch 62 by breaking the connection between contacts *i–j* of R–9, disconnects the system from the telephone line TL, effecting the same operation as that which is effected with "hanging-up" a conventional telephone set or unit. At this time, and with R–9 energized, the connection between *f–g* of R–9 is not complete, and lines 124 and 126 do not connect short delay means 130 with electrical ground. The short delay means 130 is a conventional time circuit adapted to produce an output at a predetermined time, such as, for example, five seconds, after its connection with electrical ground has been broken. Thus, the short delay means 130 produces an output essentially five seconds after the initial operation where its connection with electrical ground is broken, and this output feeds to a relay drive 132 also of conventional design. The relay drive 132, and other relay drives referred to hereinafter are conventional transistor amplifiers, for example, which produce a suffiicient output to opearte a relay in response to a relatively weak control signal.

The relay drive 132 responds to the output of the short delay means or circuit 130 to energize relay R–7 when the delay time of the short delay means 130 has expired following the break in its connection with ground. Energization of relay R–7 results in breaking the connection between contacts *c–d* thereof, and as a result, relay R–9 is de-energized. De-energization of relay R–9 in turn permits line switch 62 to again close (i.e., contact *i–j* of R–9 are again connected). At this point, the system has effected a "hang-up" operation, and then has subsequently connected itself with the line.

Assuming the operation at the central telephone station is satisfactory, a dial tone will appear on the line TL. This dial tone, or specifically, the dial tone signal, passes through the closed connection between contacts *c–d* of R–4, the closed connection between contacts *i–j* of R–9, and the then closed contacts *e–d* of R–10. R–10 was energized with initial operation of the system since R–10 merely comprises a relay connected with the B— power supply. This relay, being so connected, would only open the connection between contacts *e–d* thereof in the event of a B— failure. The dial tone signal therefore passes to and through the contacts *c–d* of R–8, such contacts providing part of the dial switch 66. After traversing the contacts *c–d* of R–8, the dial tone signal passes on to line 134 and through the primary winding of a transformer 136 to the secondary winding of such transformer, and then into an amplifier 138 which amplifies the dial tone signal. The output of amplifier 138 leads via line 140 to a monitoring amplifier 142 and in turn a monitor speaker 144.

Such output also leads via the line 140 and the line 146 to switch S–4, which switch, when in position *a*, feeds to an emitter follower 148. The output of the emitter follower, still corresponding to the dial tone signal, is fed via line 150 and through contacts *c–d* of R–6 to line 152 and into a dial tone detector 154. The dial tone detector comprises a conventional filter circuit adapted to pass or produce an output only when frequencies within a predetermined range are fed thereto, and in this instance, is selected, so as to pass or produce an output in response to a signal preferably having a frequency of the order of a dial tone frequency, but in any instance, a specific signal corresponding thereto. When the dial tone detecor 154 produces an output, a dial deck relay driver 156 is conditioned to opearte relay R–1. Relay R–1, as shown, is preferably a double coil relay which latches in one of two conditions.

In the embodiment shown, the dial deck relay driver 156 energizes coil 1 of R–1, and this results in closing the connection between contacts *g–h* of R–1. This completes a circuit through the solenoid 110, and in turn, the solenoid 110 activates or energizes the motor 106 of the dial deck. The motor 106 of the dial deck then moves the dial deck tape cartridge whereby the tape initially passes the play-back head 14 and thereafter passes the dial recording head 16. As the tape moves past the play-back head 14, the dial information bits corrsponding to particular digits are fed therefrom via the line 158 to an amplifier 160 which increases the amplitude thereof and feeds the amplified signal via line 162 to a dial digit converter 164.

The dial digit converter is a conventional pulse train detector including a filter and wave shaping circuit, also of conventional design. The dial digit converter 164 converts the dial digit information bits of 1 kc. frequency into square waves having a duration substantially equal to duration of the 1 kc. bursts. Such square wave is fed via the line 166 to the relay driver 168 which in turn energizes the relay R–8. With each energization of the relay R–8, the electrical feed connection with the line TL is broken due to the opening of the connection between contacts *c–d* of R–8. These contacts, therefore, function as a dial switch feeding to the line "makes" and "breaks" corresponding to a particular number being dialed.

The operation of relay R–8 to "make" and "break" the connection with the line continues until an entire digit information sequence corresponding to a particular number is completed. Once this operation is completed, and as will be remembered from the preceding discussion, a control signal of a substantially different frequency than the frequency of the digit information bits appears on the line 158. The dial signal converter is not responsive to this control signal and thus driver 168 does not energize R–8 while the control signal is being fed from the play-back head 14.

Alternatively, however, a control signal detector 170 is responsive to the control signal fed over the line 158, through the amplifier 160 and over the line 162. The control detector 170 which includes a conventional filter circuit adapted to selectively pass frequencies of the order of the control signal, feeds to a control relay driver 172. The control relay driver 172, in turn, energizes the relay R–2. This results in closing the connection between contacts *j–k* of R–2 thus maintaining the circuit of solenoid 110 closed for the duration of the control signal appearing on the line 158. Furthermore, energization of the relay R–2 results in closing the contacts *d–e* of R–2 and thus, via these contacts and the line 174, both coil 2 of R–1 and R–6 are energized. Energization of coil 2 of R–1 resets R–1 to its initial condition opening contacts *g–h* thereof. However, solenoid 110 remains energized because contacts *j–k* of R–2 have been closed.

Energization of R–6 closes contacts *j–k* of R–6 which electrically latches R–6 through line 124 and contacts *f–g* of R–9. Also, with energization of the relay R–6, contacts *e–d* close.

Closing of contacts *e–d* of R–6 is particularly significant because this connection serves to couple the incoming signal as fed through switches 62, 64, 66, line 134, transformer 136, amplifier 138, line 140, line 146, S–4 emitter follower 148, and line 150 to a line 175 which delivers such signal to an audio detector 176.

The audio detector 176 includes a conventional filter circuit which passes or produces an output in response to signals corresponding to voice signals within the normal voice signal range. Thus, if at the receiving end or remote location, the number dialed has been answered and the answering party speaks, saying "Hello" or the like, then such signal is fed to the audio detector 176 which in turn produces an output fed via line 178 to a message deck relay driver 180. The message deck relay driver 180, upon receiving the output from the audio detector 176, energizes coil 1 of message deck relay R–4. This relay, like the relay R–1, is a double coil relay of the latching type. When coil 1 of R–4 is energized, contacts *g–h* of R–4 are closed, thus completing the circuit through the solenoid 112 of the message deck and in turn, starting the drive motor 108 so that the tape or message deck 52 is driven.

Operation of the message deck 52 results in moving the tape thereon past the pickup head 30 which feeds the message signal into the line 182 and through amplifier 184, which delivers the amplified signal through connection *c* of switch S–4 via line 186 to a further amplifier 188. Amplifier 188 delivers further amplified signals from the message deck tape through a transformer 190 and into line TL through the then closed contacts *c–e* of R–4. In other words, when R–4 was energized by the message deck relay driver 180 in response to the output from the audio detector 176, it completed the circuit through the message deck solenoid to start drive of the message deck, and it also completed the line connection from the message deck through the transformer 190 and the contacts *c–e* of R–4. The message on the message deck is thus delivered to the line so that the answering party receives the same.

It will be remembered that immediately following the message signal or signals on the massage tape is a control signal. Accordingly, once the message has been delivered from the pick-up head 30 to the line TL, the pick-up head feeds a control signal on the line 182, which control signal passes through the amplifier 184 and onto the line 186. A control signal detector 192 is connected with the line 186, which control signal detector responds to the control signal from the message deck producing an output in response thereto. This control signal detector is essentially the same in construction as the control signal detector 170 referred to previously. The output from the control signal detector 192 is fed to a control relay driver 194 which drives or energizes relay R–5.

Energization of relay R–5 immediately closes the connection between contacts *j–k* thereof, thus maintaining the circuit through the solenoid 112 in completed condition. Simultaneously, contacts *d–e* of R–5 close, thus connecting coil 2 of R–4 with ground, and also connecting R–9 with ground, but this time through line 120 and line 196. This results in energizing R–9 and opening the connection between contacts *i–j* thereof—here again effecting a "hang-up" operation at the termination of the message delivery and in response to the control signal fed from the message deck.

Energization of relay R–5 in response to the output from the control detector 192 also results in closing contacts *g–h* of R–5, thus connecting R–3 with ground through contacts *h–g* of R–5, and line 198. Since R–3 is also connected to B—, R–3 energizes closing contacts *d–e* thereof which through the line 200 maintain R–3 energized by virtue of the normal connection with ground through contact *c–d* of R–2.

R–2 has by this time been de-energized and assumed its normal state since the control signal passing from the dial deck tape through the play-back head 14 is no longer existent, such signal having stopped at the end thereof and being followed by a dead space on the dial deck tape as explained above. Relay R–3 thus remains energized connecting itself with ground through contact *d–e* thereof, and also closing contacts *g–h* therefore to connect a completed call oscillator 202, forming part of the completed call control 88, with ground. Oscillator 202 feeds the output therefrom to the recording head 16. The oscillator 202 thus delivers a "write-over" signal to the tape on the dial deck, and this "write-over" signal has a frequency (e.g. 2 kc.) different from any frequency to which the system is responsive, whereby the oscillator signal essentially serves to "erase" any signal on the tape thereafter passing the recording head 16 while oscillator 202 is operating.

Simultaneously with the connection of the oscillator 202 with B— through the contacts *h–g*, the completed call counter 90 is similarly connected to B— and in turn, the completed call counter registers one complete call.

The completed call oscillator 202 remains in operation until such time as R–2 is again energized. In this regard, it is to be remembered that R–2 was energized when the control signal from the dial deck appeared on the line 158, passed through the amplifier 160 and appeared on the line 162. Accordingly, the oscillator 202 keeps producing its output until such time as the next successive control signal from the dial deck energizes relay R–2, and at that time, contacts *c–d* of R–2 are broken so that R–3 is de-energized. If the heads 14 and 16 of the dial deck are properly spaced apart in the manner previously indicated, as by the provision of a tape loop 32, then any answered number will appear at the recording head 16 and be "erased" during a following dial operation and before the oscillator 202 is de-energized.

Again referring to the output from the massage deck, it will also be remembered that the control signal which followed the message is itself followed by a dead space on the message tape. When this dead space on the message tape passes in front of the pick-up head 30 of the message deck, there is no output on the line 182, no output through the amplifier 184 and no output on the line 186. Accordingly, the control detector 192 does not produce an output and the relay R–5 is de-energized, but R–4 remains in its set condition since it is a latching-type relay.

With all of the control signals having been removed the system is essentially reset to its initial condition with the only exception being the operation of the completed call oscillator 202. Specifically, when the control signal from the dial deck is no longer fed from the play-back head 14 thereof, the relay R–2 is de-energized, and this results in opening the connection between the contacts *j–k* thereof so that the solenoid 110 of the dial deck was de-energized at the end of the control signal following the given dial digit sequence and the dial deck motor was then stopped. Similarly, when there is no output on the line 182, the control detector 192 does not produce an output and the control relay driver no longer energizes relay R–5. This means that contacts *j–k* of R–5 open, so that solenoid 112 is no longer energized and motor 108 then stops.

Moreover, but of equal importance, it is to be noted with respect to the control relays R–2 and R–5, that each one includes contacts that reset the respective relays R–1 and R–4. Specifically, when R–2 is energized, coil 2 of R–1 is connected with ground so that it causes R–1 to return to its initial condition. Likewise, when R–5 is energized, coil 2 of R–4 is connected to ground, and this results in returning R–4 to its initial condition. Yet, with the return of R–1 to its initial condition and with the return of R–4 to its initial condition, the motor drives for the dial deck and message deck respectively are not de-energized because in each instance the control relays R–2 and R–5 respectively maintain connection through contacts *j–k* of R;2 and *j–k* of R–5, respectively until the control relays are de-energized.

Once the system has returned to its initial condition, then the operation described immediately above is repeated with the short delay means 130 being free to activate the relay driver 132, and in turn energize relay R–7. With R–7 energized, R–9 is de-energized after a predetermined time, and when de-energized, it again connects the system with the line TL so that the dial tone again initiates the system to dial the next number.

It has been assumed in the preceding paragraphs that the number being dialed was answered, and that the answering party placed on the line a voice signal detected by the audio detector 176 which initiates operation of the relay R–4 and in turn the delivery of the message. However, it is quite possible that either there is no answer at the number being called and/or that the number being called is "busy." The system operates to compensate for these two contingencies.

Referring again to the dial detector 154, and assuming the system is connected for its initial operation as prescribed above so that a dial tone is fed to the detector 154, then the same produces an output, as indicated, which output activates the dial deck relay driver 156. This energizes coil 1 of R–1 and completes the circuit through the contacts *g–h* of R–1 to start the solenoid 110 and in turn the dial deck motor, all as explained. At the same time, however, contacts *j–k* of R–1 close, and this results in connecting the line 230 with B—. The line 230 feeds to the long delay means 232. Long delay means 232 is a timing circuit, of conventional design, which is rendered inactive so long as it is connected with B—, but when not so connected, this circuit produces an output. In the preferred embodiment, the long delay means 232 is adapted to produce its output which activates relay driver 234 to energize R–9 a predetermined time, (e.g., 40 seconds) after the long delay means 232 has been disconnected from B—.

In the normal system operation, the long delay means 232 is connected with B— through contacts *j–k* of R–1 and line 230 as soon as the dial tone has been detected and it remains connected with B— through contacts *j–k* of R–1 until such time as R–1 is de-energized. However, with de-energization of R–1 following energization of R–2 with the delivery of the dial control signal, long delay means 232 does not necessarily operate. Instead, if the number answers, the audio detector 176 produces an output, and this results in energizing coil 1 of R–4. In turn, contacts *j–k* of R–4 connect the long delay means via lines 230 and 240 with B—. Thus, the long delay means is rendered ineffective when the number is answered.

Assuming that there is no answer during the period when the audio detector 176 is connected with the line, then there would be no output from the audio detector and in turn, the long delay means 232 would not be connected with B— after R–1 returned to its initial condition. The audio detector being insensitive to the "ringing" signal and to the "busy" signal would not produce an output in the event of no answer, and accordingly, the long delay means 232 would not be connected with B— due to the detection of a return answering signal. The long delay means would thus be conditioned to energize R–9 through driver 234 at the end of the exemplary 40-second period following the dialing—i.e., 40 seconds after R–2 was energized and R–1 returned to its initial state.

In the preceding discussion, it has been assumed that the system hereof is operating directly into the telephone line TL, having been connected directly therewith by a telephone jack or the like. However, for certain applications, it is desirable to operate the system hereof with a conventional telephone set such as shown, for example, in FIGURE 5. This telephone unitis adapted for human operation and has a dialing means thereon including a dial disc 350. Associated with the unit is a hand set 352 having, as conventional, a speaker 354 and a microphone 356. The telephone unit itself, as generally designated by the numeral 360, further includes a cradle 362 having a switch control plunger 364 extending upwardly therefrom. As well known by the average person, the switch control plunger 364 operates a connect and disconnect switch which serves to couple the telephone unit 362 in a telephone line. Normally, in use of such unit, an operator would lift the handset 352 so as to connect the unit in the line, and thereafter he would manually operate the dial disc 350 in order to dial a given number.

With the invention, a telephone unit such as shown in FIGURE 5 can be automatically operated. To this end, the unit further has associated therewith a pickup or microphone 300, a speaker 302, a solenoid 310 and a mechanical stepping switch or so-called "LEDEX" 314. The pickup 300 is fixed in position by a suitable mechanical connection, such as schematic mechanical connection 370, so as to be located adjacent the speaker 354 of the hand set 352. Similarly, the speaker 302 is held adjacent the microphone 356 of the hand set 352 by a suitable mechanical connection, schematically shown and designated as 372. The solenoid 310 is positioned above the switch control plunger and maintained in position by a schematically shown mechanical connection 380. An operating arm 311 extends downwardly from the solenoid 310, and when the solenoid 310 is de-energized, the arm 311 depresses the plunger 364 to effect a "hang-up" operation.

The stepping switch mechanism 314 includes an operating member 317 which cooperates with the dial disc 350 so as to move the same to a predetermined rotational position and then release it to dial the number. Stepping switches suitable for use for this purpose are readily available on the commercial market, and generally any stepping switch adapted to effect mechanical operation of the dialing disc in response to electrical dial digit signals can be used. Accordingly, further discussion of the details in this regard appears unnecessary.

When the invention is operated through a telephone unit, as opposed to being directly connected with the line, then the switch S–4 is moved from the position shown in FIGURE 3B to the position wherein contact is made through the respective contact points *b* and *d* thereof. With contact point *b* in the line, the incoming signal is fed to the emitter follower 148 from amplifier 305 which, in turn, is connected by line 301 with the pickup 300. Similarly, with contact *d* of switch S–4 being in circuit, the output signal from the system is fed through amplifier 304 and line 303 to speaker 302. The speaker 302, as indicated, feeds into the microphone 356 of a conventional handset 352 and similarly the pickup 300 receives its signals from the speaker 354 of such handset.

The stepping switch means 314 is connected into the system via the line 390, which as will be noted by reference to FIGURE 3B, is connected with B— through contacts *i–k* of R–8. The solenoid 310 as shown in FIGURE 6 is coupled with a power supply by contacts *a–c* of R–11, and R–11 is connected into the system via line 309, which line, as shown in FIGURE 3B is connected to ground through contacts *f–g* of R–9.

In operation of the system of the invention with a conventional handset such as shown in FIGURE 5, the signal input and signal outputs take place in essentially the same sequence as described above, and effect the same control operation. The difference resides (1) in the fact that the input signal and output signals of the system are fed indirectly to the telephone line through the pickup 300 and speaker 302 respectively, (2) in the fact that the hang-up operation is effected indirectly through the solenoid 310, and (3) in the fact that the dial signals do not directly "make" and "break" the telephone line, but instead, operate the stepping switch means 314 via contacts *l–k* of R–8 and connection line 390. In other words, with energization and deenergization of the relay R–8, the contacts *i–k* thereof close, thus connecting the line 390 with B— and supplying power in sequential steps to the stepping switch 314 to operate the same. To control the selective movement and release operations of the stepping mechanism 314, a clutch control 400 is used. This clutch control is linked by line 401 to an electrically responsive clutch 402. The clutch control is a detector circuit response to an "inter-digit" pause to release the clutch and permit return rotation of the dial disc.

It should immediately be apparent that with the mechanical dialing system such as shown in FIGURE 5, the system of FIGURE 3 functions in the same manner as it does when operating directly with the line. In each instance, the squence is the same. It is accordingly believed unnecessary to repeat the discussion of the operation.

The operation of the systems of FIGURES 3 and 5 is the same as the operation of the system of FIGURE 2, as should be apparent. In essence, the line switch 62 of FIGURE 2 includes contacts *i–j–k* of R–9 with a direct line connection, or alternatively, when the unit of FIGURE 5 is used, the line switch 62 of FIGURE 2 includes the switch operated by plunger 364, solenoid 310, and the operating circuits directly connected with such solenoid. The power failure switch 64 in each instance corresponds to relay R–10 and contacts *c–d–e* thereof. The dial switch 66 comprises the relay driver 168 and relay R–8, with its associated contacts with direct operation, and these components together with the stepping switch 314, dial disc 350, and dialing switches operated by such disc, if the arrangement of FIGURE 5 is used.

The dial signal converter 164 corresponds to the dial signal converter means 68. The play-back amplifier 160 can form part of the dial signal converter means, or alternatively, part of the dial information storage operating means. Such operating means, in any event, further includes the dial deck motor 106 and the dial deck solenoid 110 as well as the play-back head 14. With the solenoid 110 and motor 106 specifically forming a dial drive means such as the dial drive means 54.

The condition detector 72 of FIGURE 4 includes the control detector 170, control relay driver 172, relay R–2 and its associated components, all as shown in FIGURE 3. In addition, it would include the relay R–6 and specifically its contacts *c–d–e* which connect the input with the audio detector.

The audio detector 80 includes the audio detector 176 as well as the message deck relay driver 180, and the relay R–4 with its associated contacts. Alternatively, however, the message drive 56 of FIGURE 2 can be deemed to include the relay R–4 and the message deck relay driver 180. The operating means for the message deck include the motor 108, the solenoid 112, and the play-back head 30 associated therewith. Similarly, the message feed means 82 of FIGURE 2 would include the amplifier 184, the amplifier 188 and the transformer 190, or alternatively, if the unit of FIGURE 5 is used, the amplifier 184, the amplifier 304, and the speaker 302 as well as the microphone of the hand set.

The reset means 84 of FIGURE 2 would include the control detector 192, the control relay driver 194 and the relay R–5 with its associated contacts.

The delay control means 65 of FIGURE 2 would include the short delay means 130, the relay driver 132 and relay R–7 as well as the long delay time means and relay driver 234 associated therewith.

Other specific contact pairs and/or relays shown in FIGURE 3 and not specifically related to one of the means presented in FIGURE 2 would, in fact, form part of one of such means, but the exact designation of what detailed components fall into which particular means is insignificant to an understanding of the invention and the definition thereof set forth in the appended claims.

There are, however, certain factors not specifically discussed above, but which should be noted, namely:

(1) In preceding portions of this specification, reference has been made to the fact that the dialing information can consist of any number from 1 to 10. As should be readily appreciated by those of ordinary skill in the art, these numbers correspond to the digits 1 through 9 and 0 as used on the conventional telephone dial. Thus, 0 is represented by ten 1 kc. bursts or signal bits, whereas other numbers are represented by the actual exact corresponding number of such bursts or bits.

(2) The operation of the dial and message decks has been explained above with the solenoids 110 and 112 respectively starting and stopping the motors 106 and 108. In actual practice, it has been found preferable to utilize such solenoids to complete a mechanical linkage between the respective motors and the respective cartridges driven thereby. In other words, by using the solenoids to complete mechanical linkages whereby they serve as essentially conventional clutches, more satisfactory operation is achieved. Specifically, with such arrangement, the respective motors are permitted to run continuously and the solenoids mechanically control the drive coupling of the motors with the cartridge at the desired times.

(3) A further preferred aspect not mentioned above concerns the use of a micro-switch 103 in the line 104. This micro-switch is controlled by the message deck lock and release lever 12 (FIGURE 1) so that such lever closes the micro-switch 103 when the lever is placed in the lock position and opens the micro-switch when the lever is placed in the release position. This results in applying AC power to, and removing AC power from, the dial deck motor 106 and the message deck motor 108, as appropriate.

(4) There are certain connections made during the operations to apply B— to, or remove B— from, specific components, and these connections, while shown in the drawings, possibly need slight explanation. First, it is to be noted that energization of relay R–1 closes contacts *i–k* of R–1 which applies B— to the long delay means 232 thus rendering it inoperative. Secondly, energization of coil 2 of R–1 opens contacts *i–k* of R–1 removing B— from the long delay means 232, thus starting the predetermined timing cycle of the long delay means. Thirdly, energization of relay R–4 also closes contacts *i–k* of R–4 which applies B— through line 240 to the long delay means 232 thus resetting the long delay means and rendering it inoperative.

Quite obviously, the circuit components shown in FIGURES 3 and 5 can be of conventional types without requiring any special modification, but instead, only being adapted to the prescribed function to be performed. Thus, various modifications can be made to the arrangement hereof without departing from the scope and spirit of the invention.

Having now described various embodiments of the invention in considerable detail, it should be apparent that the objects set forth at the outset of the present specification have been successfully achieved.

What is claimed is:

1. A telephone dialing and message delivery system comprising in combination: first magnetic storage means carrying successive dial signal sequences thereon; second magnetic storage means carrying message signals thereon;

at least one of said storage means also having control signals thereon; control circuit means responsive to said control signals and return signals received from a telephone line for initiating operation of said first magnetic storage means causing a dial signal sequence to be delivered to a telephone line, detecting the operating condition at a station linked in the line in accordance with a given dial sequence, and, in accordance with the operating condition detected, for alternatively initiating operation of said second magnetic storage means causing message signals to be delivered to said line or for initiating further operation of said first magnetic storage means causing the delivery of the next succeeding dial signal sequence to the line, said control circuit means additionally initiating further operation of said first magnetic storage means causing the delivery of the next succeeding dial signal sequence to the line after delivery of said message signals to the line; and switching means responsive to said control circuit means for delivering said dial signal sequences to said line, conditioning said control circuit means to detect said operating condition, and delivering said message signal to the line.

2. The combination defined in claim 1 wherein said circuit control means includes timer means for rendering said circuit control means operative only during selected periods of a day.

3. The combination defined in claim 1 and further including monitoring means for audibly reproducing signals appearing on the telephone line during operation of said system.

4. The combination defined in claim 1 wherein said switching means includes a mechanically operable dial switching assembly normally adapted to be manually controlled, and wherein said control circuit means includes transducer means for receiving signals from and delivering signals to the telephone line through a manually useable handset having audible signal pickup and audible signal reproducing means.

5. The combination defined in claim 1 wherein said control circuit means responsive to said return signals and said control signals includes filter means for detecting a dial tone on the telephone line, and providing an output signal in response thereto, and filter means for detecting an answering voice signal on said line and providing an output signal in response thereto, and wherein said switching means is responsive to said output signals.

6. The combination defined in claim 1 wherein said control circuit means includes recording means for destroying a given dial signal sequence of said successive dial sequences on said first magnetic storage means and means for selectively activating said recording means in response to said control signals.

7. A telephone dialing and message delivery system comprising, in combination:

(a) first magnetic storage means carrying thereon successively dial and control signals;
(b) second magnetic storage means carrying thereon successively message and control signals;
(c) operating means responsive to said dial signals for dialing a telephone number corresponding to a given sequence of said dial signals; and
(d) circuit means for selectively (1) delivering said message signals to the telephone line in response to a return signal indicating an answer from the number dialed, and (2) actuating said operating means to dial the next succeeding number corresponding to the next succeeding given sequence of said dial signals respectively, (a) after said message signals have been delivered to the line or, (b) when said return signal is not received from the line within a predetermined time indicating no answer from the number dialed;
(e) said circuit means including detector means responsive to said return signal and said control signals on said first and second magnetic storage means to condition said circuit means to be responsive to said return signal and to condition said circuit means to activate said operating means after said message signals have been delivered to the telephone line.

8. The system defined in claim 7 wherein said detector means includes filter means for producing an output signal in response to the appearance on said line of said return signal as a signal corresponding to a human voice signal, and wherein said circuit means is responsive to said output signal to deliver said message signals to said telephone line.

9. The system defined in claim 7 wherein said first and second magnetic storage means comprise continuous length of magnetic tape having said signals stored thereon.

10. The system defined in claim 7 wherein said operating means comprises a mechanically operable dialing switch means and electromechanical drive means for mechanically operating said dialing switch means in response to said dial signals.

11. The system defined in claim 7 wherein said circuit means includes recording means for changing the characteristic of signals on said first magnetic storage means, means for operating said recording means in response to delivery of said message signals over the line, whereby an answering number is not redialed on repeated operation.

12. The system defined in claim 11 wherein said recording means comprises a recording head operatively associated with said first magnetic storage means and oscillator means for feeding signals of a different frequency than said dial signals and said control signals to said recording head.

13. The system defined in claim 7 wherein said detector means comprises audio detector means responsive to a signal corresponding to a voice return signal to condition said circuit means to deliver said message signals to the telephone line:

14. For use with a telephone line, a telephone dialing and message delivery system comprising, in combination:

(a) dial information storage means having dial signals and control signals therein;
(b) first operating means for driving said dial information storage means and feeding said dial signals and control signals successively therefrom;
(c) dial switching means adapted to normally make an electrical feed connection between said system and a telephone line, said dial switching means being operable to a disconnect condition breaking said electrical feed connection between the telephone line and said system;
(d) dial signal converter means adapted to receive said dial signals as fed from said dial information storage means and operate said dial switching means to said disconnect condition in accordance with said dial signals;
(e) dial tone detector means adapted to be connected with the telephone line, said dial tone detector means producing an output signal in response to detection of a dial tone and being connected to said first operating means to actuate said first operating means in response to detection of a dial tone;
(f) audio detector means adapted to detect a voice signal fed over the telephone line and produce an output signal in response thereto;
(g) conditioning means connected to said dial information storage means and being operative to connect said audio detector means with the telephone line when a control signal is fed from said dial information storage means;
(h) message information storage means having a message thereon and a control signal thereon;
(i) second operating means for driving said message information storage means and feeding said message and said control signals therefrom, said second operating means being responsive to said output control signal from said audio detector means to start driving said message information storage means;

(j) line switching means being normally operable during use of said system in a connect condition completing said electrical feed connection but being also operable to a disconnect condition opening said electrical feed connection;

(k) delay control means for normally operating said line switching means to its disconnect condition within a predetermined time after it has been in its connect condition and then return of said line switching means to its connect condition after a predetermined length of time, said delay control means being responsive to said output signal of said audio detector means and said output signal of said dial tone detector means for not operating said line switching means to its disconnect condition;

(l) reset means for restoring said system to its initial condition in response to a control signal from said message information storage means.

15. The combination defined in claim 14 wherein said dial information storage means comprises a magnetic tape carrying thereon successively dial signals, a control signal, and a signal free space.

16. The combination defined in claim 15 wherein said dial signals consist of successive signals of a first frequency spaced apart by signal-free spaces of a first duration with each set of signals of said first frequency corresponding to a given digit being spaced apart by signal-free spaces of a second duration longer than said first duration, and wherein said control signals have a second substantially different frequency.

17. The combination defined in claim 15 wherein said first operating means comprises means for moving said tape past first and second locations, and pickup means at said first location for receiving said signals from said tape and feeding the same therefrom, and wherein said first operating means further includes recording means at said second location for changing the condition of said tape carrying said dial signals to render selective dial signals ineffective for further operation of said system in response thereto.

18. The combination defined in claim 14 wherein said dial switching means comprises a dial relay switch and means for driving said dial relay switch, and wherein said switch forms part of said electrical feed connection.

19. The combination defined in claim 14 wherein said system includes a telephone unit adapted for human operation having a mechanical dialing means thereon and a hand set with a speaker and microphone assembly operatively associated therewith, and wherein said dial switching means comprises a stepping mechanism, means operatively connecting said stepping mechanism with said mechanical dialing means, a clutch means adapted to selectively release said stepping mechanism, means for actuating said clutch means and said stepping mechanism from said dial signal converter.

20. The combination defined in claim 19 wherein said second operating means includes amplifier means receiving signals from said pickup means of said second operating means and speaker means receiving signals from said last mentioned amplifier means, said speaker means being disposed in juxtaposition to said hand set microphone whereby a message fed to said speaker is transmitted to and through said microphone.

21. The combination defined in claim 14 wherein said dial signal converter means comprises means for transforming said dial signals of a first frequency into a square wave.

22. The system defined in claim 14 wherein said dial tone detector means comprises a filter means adapted to selectively pass only frequencies of the order of frequencies of a dial tone, relay means, and means coupled between said relay means and said filter means for operating said relay means and response to an output from said filter means, said relay means including switching means in circuit with said first operating means for closing a circuit including said first operating means to thereby actuate the same.

23. The combination defined in claim 22 wherein said audio detector means comprises filter means adapted to pass substantially only audio frequencies in the voice range, relay means, and means connected between the last mentioned filter means and the last mentioned said relay means for operating said last mentioned relay means in response to an output from said last mentioned filter means, said last mentioned relay means including a switch in circuit with said second operating means, said last mentioned switch being adapted to start said second operating means.

24. The combination defined in claim 23 wherein said message information storage means comprises a magnetic tape having thereon successively a message to be delivered over the telephone lines, a control signal of a predetermined frequency, and a signal-free space, and wherein said second operating means comprises means for moving said tape past a first location and pickup means at first said location for receiving and delivering therefrom signals carried on said tape.

25. The combination defined in claim 24 wherein said second operating means includes amplifier means receiving signals from said pickup means of said second operating means, and line driver means including amplifier means and a transformer receiving signals from said first mentioned amplifier means and feeding said signals to the telephone line.

26. The combination defined in claim 14 wherein said line switching means comprises a switch connected in series with said dial switch in said electrical feed connection.

27. The combination defined in claim 14 and further including monitoring means coupled with said electrical feed connection for audibly indicating the electrical signals passing therethrough.

28. The combination defined in claim 27 wherein said monitor means includes a speaker, amplifier means connected with said speaker, transformer means, and means connecting said transformer means with said electrical feed connection.

29. The combination defined in claim 14 wherein said conditioning means comprises a filter means and switching means, said filter means being adapted to pass therethrough only signals having a frequency corresponding to said control signal on said dial information storage means, said switching means connecting said audio detector means with said electrical feed connection when said control signal is fed from said information storage means.

30. The combination defined in claim 14 wherein said reset means includes filter means adapted to pass only signals having a frequency corresponding to the frequency of said control signal in said message information storage means and switching means.

31. A telephone dialing and message delivery system comprising, in combination:

(a) dial information storage means carrying a plurality of recorded telephone numbers;

(b) message information storage means carrying at least one recorded message;

(c) actuator means for activating a telephone line;

(d) contacting means for detecting preselected ones of said recorded telephone numbers and contacting the stations represented by said numbers at successive time-spaced intervals;

(e) message delivery means for detecting said recorded message and delivering said message to a contacted station in response to a condition created by an action taken at said contacted station;

(f) elimination means for rendering undetectable the telephone number representing said contacted station to which said message has been delivered;

(g) stepping means to activate said contacting means to detect and contact another of said stations represented by said recorded telephone numbers when one of the following occurs:
(1) a message has been delivered to said contacted station;
(2) no action is taken at said contacted station; and,
(3) said contacted station is in use; and
(h) cycling means for repetitively recontacting those stations represented by telephone numbers, which have not been rendered undetectable by said elimination means, during successive cycles of operation of said system.

32. The system defined in claim 31 wherein the action taken at the contacted station is activating the receiver at said station.

33. The system defined in claim 31 wherein the action taken at the contacted station is a human voice response.

34. The system defined in claim 31 wherein the stepping means includes a time delay means adapted to energize said stepping means after a predetermined time has elapsed and no action has been taken at the contacted station.

35. The system defined in claim 31 wherein the contacting means includes detector means for determining when the line activat?d by said actuator means is operative.

36. The system defined in claim 31 wherein the dial information storage means is a magnetic recording medium.

37. The system defined in claim 31 wherein the recorded telephone numbers are a plurality of signals each representative of a character of a telephone number separated by pauses of predetermined time duration.

38. The system defined in claim 37 wherein the last character of each telephone number is followed by a control signal adapted to activate said stepping means.

39. The system defined in claim 38 wherein the dial information storage means is a magnetic recording medium.

40. A system defined in claim 39 wherein the signals representative of telephone number characters are signal bursts of a first frequency and the control signal is a signal burst of a second, different frequency.

References Cited

UNITED STATES PATENTS

| | | | |
|---|---|---|---|
| 2,039,777 | 5/1936 | Chadkin | 179—6 X |
| 2,815,401 | 12/1957 | O'Dwyer | 179—6 |
| 2,827,515 | 3/1958 | Zuber | 179—90 X |
| 2,952,740 | 9/1960 | Montrose | 179—6 |
| 2,998,489 | 8/1961 | Riesz | 179—6 |
| 3,156,771 | 11/1964 | Vaughn | 179—6 |
| 3,274,346 | 9/1966 | Sibler | 179—6 X |
| 3,360,612 | 12/1967 | Klumb et al. | 179—90 |

BERNARD KONICK, *Primary Examiner.*

R. F. CARDILLO, Jr., *Assistant Examiner.*

U.S. Cl. X.R.

179—90